(12) United States Patent
Lee et al.

(10) Patent No.: US 10,096,867 B2
(45) Date of Patent: Oct. 9, 2018

(54) COMPACT SECONDARY BATTERY MODULE INTEGRATED WITH BMS

(71) Applicant: LG CHEM, LTD., Seoul (KR)

(72) Inventors: Bum-Hyun Lee, Daejeon (KR); Jee-Ho Kim, Daejeon (KR); Jin-Kyu Shin, Daejeon (KR); Ju-Han Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/316,637

(22) PCT Filed: Dec. 15, 2015

(86) PCT No.: PCT/KR2015/013754
§ 371 (c)(1),
(2) Date: Dec. 6, 2016

(87) PCT Pub. No.: WO2016/105013
PCT Pub. Date: Jun. 30, 2016

(65) Prior Publication Data
US 2017/0194674 A1   Jul. 6, 2017

(30) Foreign Application Priority Data
Dec. 24, 2014   (KR) .......... 10-2014-0188062

(51) Int. Cl.
*H01M 10/48*   (2006.01)
*H01M 10/46*   (2006.01)
(Continued)

(52) U.S. Cl.
CPC .......... *H01M 10/486* (2013.01); *H01M 2/10* (2013.01); *H01M 2/1061* (2013.01); *H01M 2/30* (2013.01);
(Continued)

(58) Field of Classification Search
CPC .................................. G01R 31/3696
See application file for complete search history.

(56) References Cited

U.S. PATENT DOCUMENTS 8,329,324 B2   12/2012   Lee et al.
8,956,751 B2   2/2015   Noh et al.
(Continued)

FOREIGN PATENT DOCUMENTS

JP   2012-17613 A   1/2012
JP   2012-164545 A   8/2012
(Continued)

OTHER PUBLICATIONS

International Search Report, issued in PCT/KR2015/013754 (PCT/ISA/210), dated Apr. 6, 2016.

*Primary Examiner* — Basia A Ridley
*Assistant Examiner* — Christopher P Domone
(74) *Attorney, Agent, or Firm* — Birch, Stewart, Kolasch & Birch, LLP (57) ABSTRACT

A compact secondary battery module integrated with BMS is disclosed, which includes a cartridge assembly stacked and coupled with at least two or more cartridges receiving a secondary battery cell therein; and a sensing housing disposed on a side surface of the cartridge assembly, in which two or more bus bars electrically connected with an electrode of a corresponding cell are disposed in a predetermined pattern, and a BMS circuit board that can be connected with each of the bus bars is prepared integrally.

17 Claims, 6 Drawing Sheets

(51) Int. Cl.
*H01M 2/34* (2006.01)
*H01M 2/10* (2006.01)
*H01M 2/30* (2006.01)

(52) U.S. Cl.
CPC ............. *H01M 2/34* (2013.01); *H01M 10/46* (2013.01); *H01M 10/48* (2013.01); *H01M 10/482* (2013.01); *H01M 2220/20* (2013.01)

(56) References Cited

U.S. PATENT DOCUMENTS

| | | |
|---|---|---|
| 2010/0310915 A1 | 12/2010 | Satake et al. |
| 2011/0059342 A1* | 3/2011 | Lee .................... H01M 2/1077 429/93 |
| 2013/0189549 A1 | 7/2013 | Nemoto |
| 2014/0087221 A1 | 3/2014 | Kim et al. |
| 2014/0299373 A1 | 10/2014 | Nakamura et al. |

FOREIGN PATENT DOCUMENTS

| | | |
|---|---|---|
| JP | 2014-525114 A | 8/2012 |
| JP | WO 2013/054727 A1 | 4/2013 |
| JP | 2013-254878 A | 12/2013 |
| KR | 10-2010-0109857 A | 10/2010 |
| KR | 10-2012-0033044 A | 4/2012 |
| KR | 10-2012-0081402 A | 7/2012 |
| KR | 10-2013-0110246 A | 10/2013 |
| KR | 10-2013-0122323 A | 11/2013 |
| KR | 10-2013-0125334 A | 11/2013 |
| KR | 10-2014-0041337 A | 4/2014 |
| KR | 10-2014-0056836 A | 5/2014 |
| KR | 10-2014-0130357 A | 11/2014 |
| WO | WO 2007/122738 A1 | 11/2007 |

\* cited by examiner

COMPACT SECONDARY BATTERY MODULE INTEGRATED WITH BMS

TECHNICAL FIELD

The present application claims priority to Korean Patent Application No. 10-2014-0188062 filed on Dec. 24, 2014 in the Republic of Korea, the disclosure of which is incorporated herein by reference.

The present disclosure relates to a secondary battery module, and more specifically, to a compact lithium secondary battery module integrated with BMS to manage a voltage of a module, and so on.

BACKGROUND ART

With the increase of technology development and demand for a mobile device, demand for a secondary battery as energy source rapidly increases. A nickel-cadmium battery or a hydrogen ion battery was used as a related secondary battery, but a lithium ion battery and a polymer lithium ion battery having high energy density have been more widely used recently.

As a positive electrode active material of such secondary battery, remarkably highlighted is a lithium secondary battery with greater output and capacity compared to weight that uses lithium transition metal oxide, lithium complex oxide, and so on. Generally, the lithium secondary battery is composed of a structure in which an electrode assembly of a positive electrode/separator/negative electrode structure, together with an electrolyte are embedded in a sealed container.

Meanwhile, the lithium secondary battery is composed of a positive electrode, a negative electrode, a separator interposed therebetween, and the electrolyte. Further, the lithium secondary battery may be categorized into the lithium ion battery (LIB), the polymer lithium ion battery (PLIB), and so on according to which materials are used for a positive electrode active material and a negative electrode active material. In a related art, the electrode of the lithium secondary battery may be formed by coating the positive electrode or negative electrode active material on a current collector such as aluminum or copper sheet, mesh, film, foil, and so on, and drying the same.

Generally, in a secondary battery module, a slave form of BMS is provided at a module side to provide data regarding voltage/temperature of each cell, and in an example of an automobile secondary battery pack, a master form of BMS is provided on an upper end such as PCS or EMM to generally manage the overall functions of an entire secondary battery pack.

Further, in an example of a secondary battery module for use as an energy storage system (ESS), for series/parallel scalability between modules, the secondary battery module is formed in such a configuration that a master form of BMSs is provided between separate modules for balancing of the separate modules, and the corresponding data, i.e., the data of each of the slave BMSs is delivered to the master BMS at the uppermost end by using the daisy chain form.

According to a related art, because the secondary battery modules are variously suggested, and configurations and positions of a cartridge constructing a module and a bus bar for sensing are different from each other, an efficient coupling process is difficult to be implemented and welding quality of the sensing structures is lowered. Further, because unnecessary dimensional area of the secondary battery module is provided for a process such as welding, energy density of the secondary battery module may deteriorate ultimately.

Further, the secondary battery module used in an energy storage system or a power storage system puts a focus on the technology development of configuring the secondary battery module to be most compact for the heightened energy efficiency or density.

DISCLOSURE

Technical Problem

The present disclosure is designed to solve the problems of the related art, and therefore the present disclosure is directed to providing a compact secondary battery module integrated with a master BMS, in which BMS has a structure of being coupled with a cartridge assembly for the facilitated detachment and attachment.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a compact secondary battery module integrated with BMS, including: a cartridge assembly in which at least two or more cartridges receiving a secondary battery cell are stacked and coupled; and a sensing housing disposed on a side surface of the cartridge assembly, in which two or more bus bars electrically connected with an electrode of a corresponding cell are disposed in a predetermined pattern, and a BMS circuit board that can be connected with each of the bus bars is prepared integrally.

Preferably, the sensing housing may be selectively coupled with or separated from the cartridge assembly.

Preferably, the secondary battery module may include a plurality of housing hooks provided on an edge of the sensing housing; and a plurality of assembly fastening grooves provided on a side surface of the cartridge assembly such that each of the housing hooks is coupled.

Preferably, the secondary battery module may include spare holes prepared on the BMS circuit board to be connected with each of the bus bars to enable rework of the BMS circuit board.

Preferably, the BMS circuit board may be a master BMS circuit board to manage voltage and/or temperature data of each cell sensed by each of the bus bars.

Preferably, the secondary battery module may further include a sensing cover that can be coupled with or separated from the sensing housing selectively.

Preferably, the secondary battery module may include a plurality of cover hooks prepared on an edge of the sensing cover; and a plurality of housing slots prepared in the sensing housing such that each of the cover hooks is coupled.

Preferably, in the secondary battery module, the two adjacent cartridges of the cartridge assembly may be hook-coupled each other.

Preferably, the cartridge assembly may further include an upper cover and a lower cover which are respectively hook-coupled with the cartridges on both ends.

In another aspect of the present disclosure, there is also provided a secondary battery pack including the compact secondary battery module, and such secondary battery pack includes a home photovoltaic solar panel energy storage system.

Advantageous Effects

The present disclosure gives the following effects.

A compact secondary battery module integrated with BMS according to preferred exemplary embodiments of the present disclosure gives the following effects.

First, because a master BMS is integrally implemented with a bus bar in a sensing housing and the sensing housing may be selectively hook-coupled or snap-coupled with a side surface of a cartridge assembly, a secondary battery module may be configured to be compact.

Secondly, by preparing spare holes on the BMS, detachment/attachment may be facilitated for re-use or rework of the BMS.

Thirdly, by integrating the master BMS with the secondary battery module having facilitated series/parallel scalability between separate modules, proper module structure for an energy storage system may be provided.

DESCRIPTION OF DRAWINGS

The accompanying drawings illustrate preferred embodiments of the present disclosure and together with the foregoing disclosure, serve to provide further understanding of the technical spirit of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The term 'BMS' used in the present disclosure indicates a battery management system.

Figure 1:
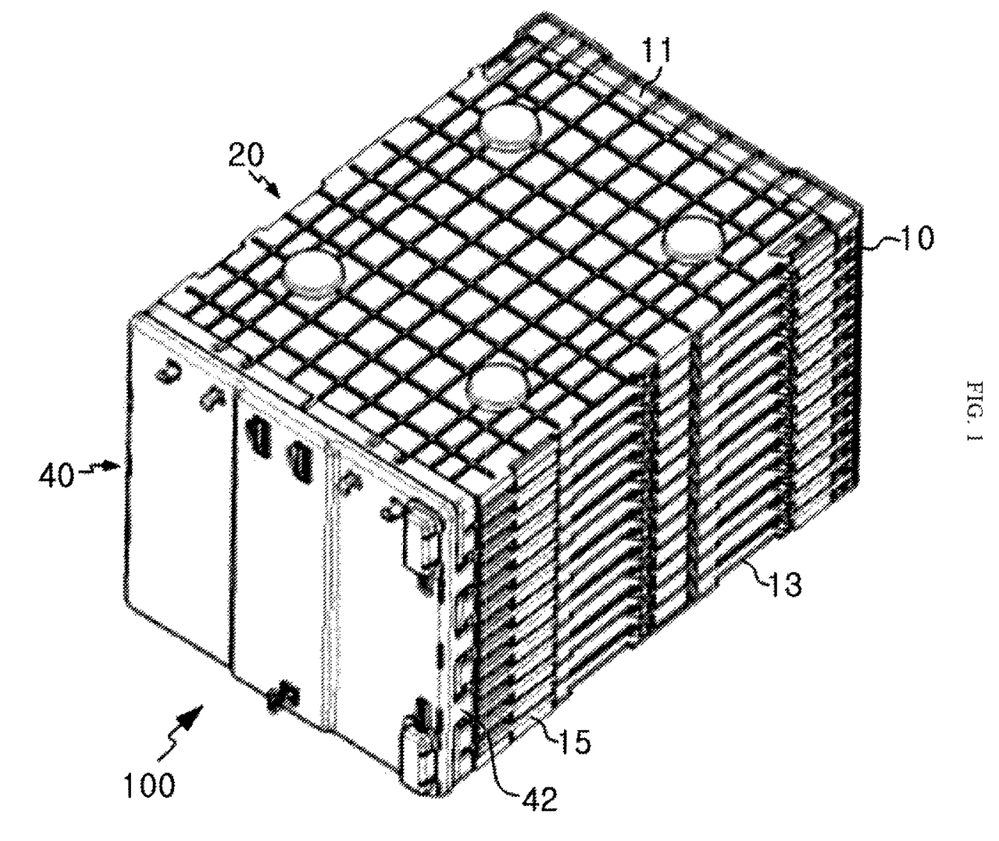
FIG. 1 is a perspective view illustrating a secondary battery module according to an exemplary embodiment of the present disclosure in an assembled state.
Figure 2:
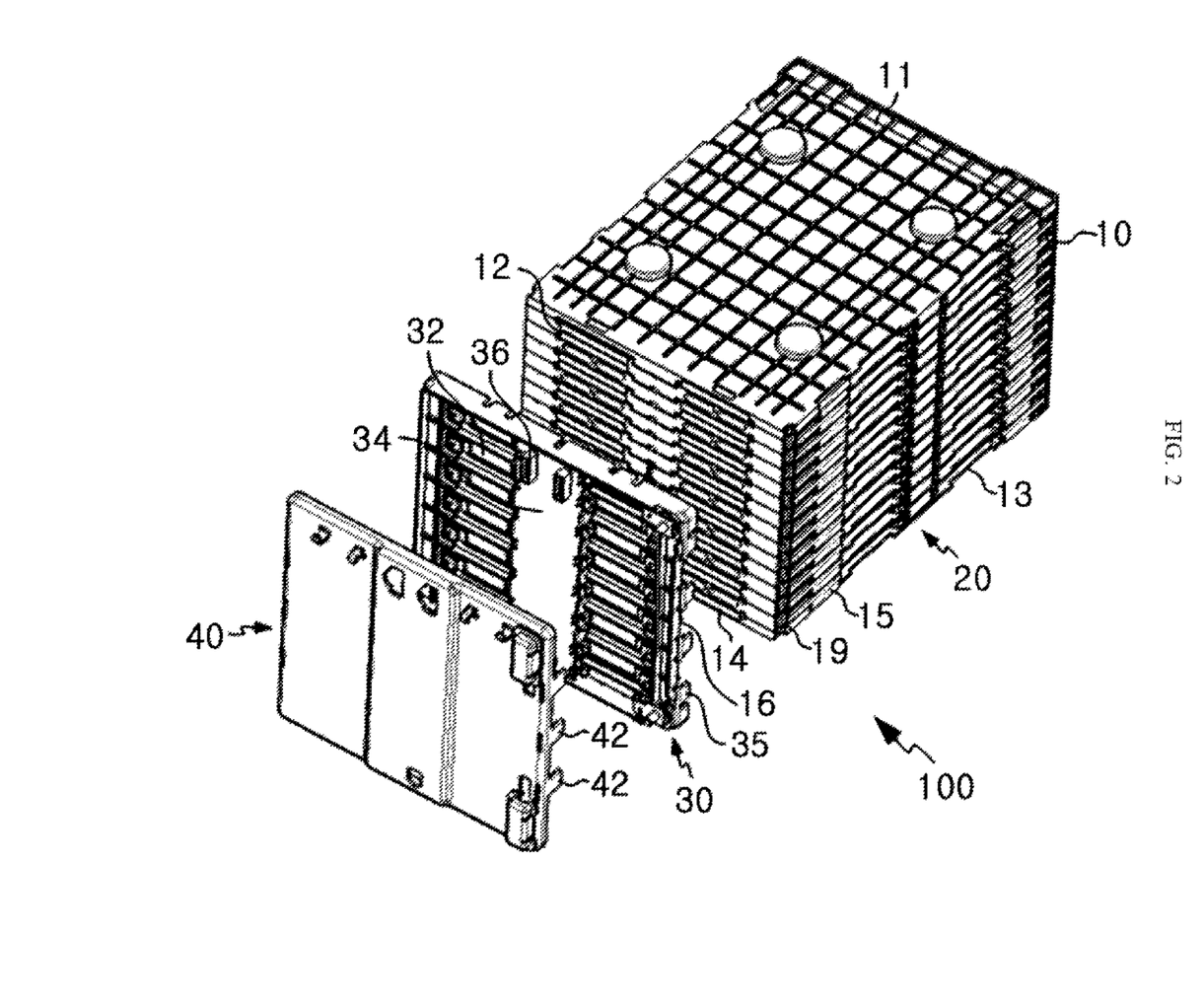
FIG. 2 is a partial exploded perspective view illustrating a secondary battery module according to an exemplary embodiment of the present disclosure.
Figure 3:
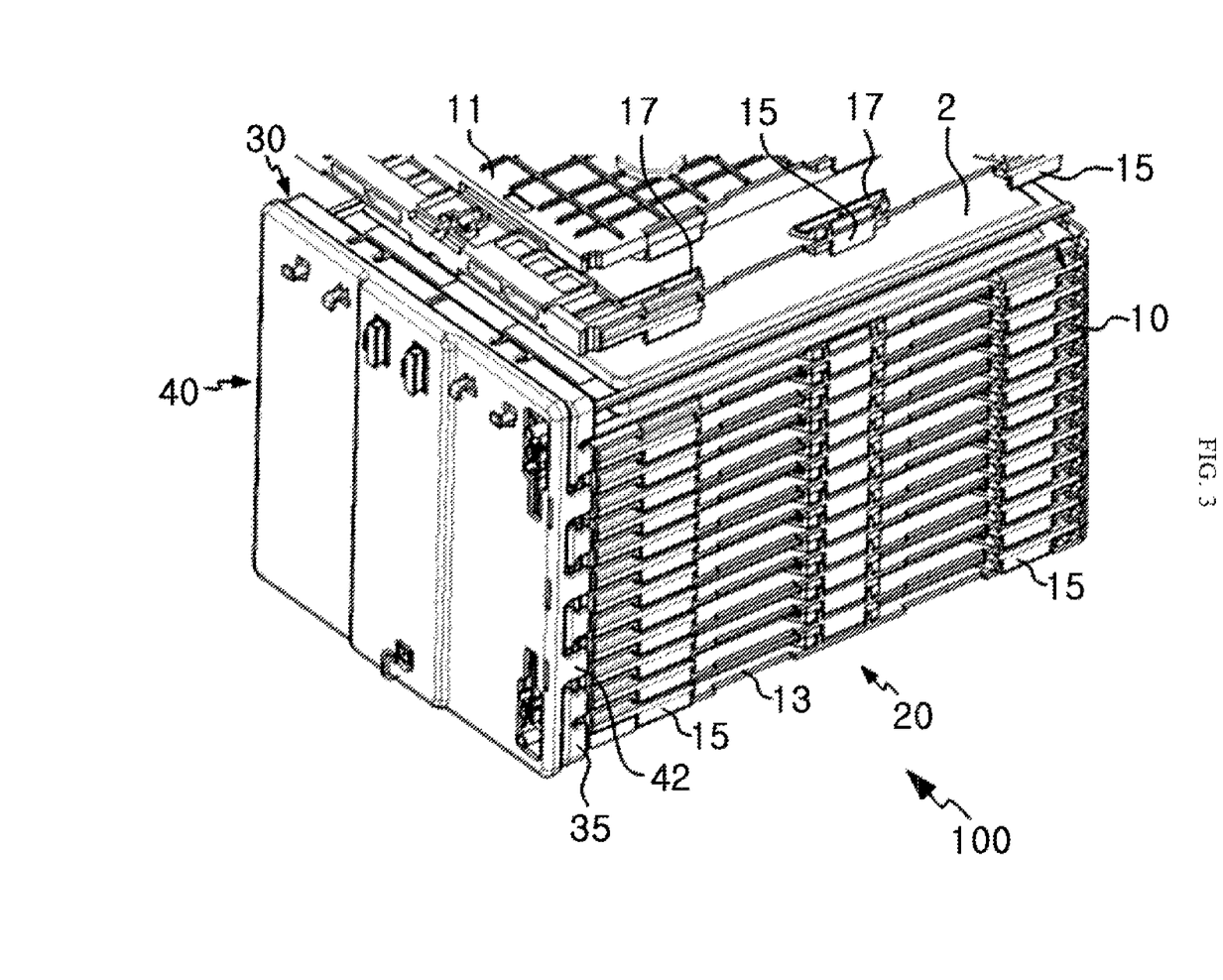
FIG. 3 is another partial exploded perspective view of a secondary battery module according to an exemplary embodiment of the present disclosure.

FIG. 1 is a perspective view of a secondary battery module according to an exemplary embodiment of the present disclosure in an assembled state, FIG. 2 is an exploded perspective view of the secondary battery module according to an exemplary embodiment of the present disclosure, and FIG. 3 is another partial exploded perspective view of the secondary battery module according to an exemplary embodiment of the present disclosure.

Referring to FIGS. 1 to 3, a compact secondary battery module 100 according to an exemplary embodiment of the present disclosure includes a cartridge assembly 20 stacked with a plurality of cartridges 10 receiving respective cells 2, a sensing housing 30 coupled with a side surface of the cartridge assembly 20 by, for example, one-touch, snap-fit, or hook manner, and a sensing cover 40 configured to protect a plurality of bus bars 32 and a BMS circuit board 34 installed in the sensing housing 30.

The cartridge assembly 20 is a stack of a plurality of cartridges 10 injection-molded with plastic and having a receiving portion for receiving the cell 2. Each cartridge 10 may be preferably coupled with the snap-fit or the hook. Each cartridge 10 may include a plurality of cartridge hooks 15 and cartridge slots 17 on a side surface in order to be coupled with the adjacent cartridge 10. For example, the cartridge hook 15 may be protruded on a lower portion of an edge of each cartridge 10, and the cartridge slot 17, to which the cartridge hook 15 of the adjacent cartridge 10 is to be inserted and coupled, may be prepared on an upper portion of the edge of the cartridge 10.

The cartridge assembly 20 may include an upper cover 11 and a lower cover 13 which are coupled with the cartridges 10 on both ends by hooking, for example. The upper cover 11 and the lower cover 13 may be respectively injection-molded so as to have substantially the same shape as the separate cartridge 10 of the cartridge assembly 20. The upper cover 11 may be provided with the cartridge hook 15 to be coupled with the cartridge slot 17 of the adjacent cartridge 10, and the lower cover 13 may be provided with the cartridge slot 17 to be inserted and coupled with the cartridge hook 15 of the adjacent cartridge 10. The upper cover 11 and the lower cover 13 may have a function of protecting the cells 2 received in the cartridges 10 on both ends and have functions and structure of closing and surrounding an external shape of the secondary battery module 100, which can be easily understood by a person skilled in the art.

In an example where the cartridge 10, the upper cover 11 and the lower cover 13 are each stacked to form the cartridge assembly 20, fastening grooves 19 are prepared on each of the side surfaces to be coupled with a housing hook 35 of the sensing housing 30, which will be described below. That is, when the fastening grooves 19 of each cartridge 10 are previously formed with the injection molding and the cartridges 10 are stacked to form the cartridge assembly 20, such fastening grooves 19 are selectively coupled with the housing hook 35 of the sensing housing 30. The fastening grooves 19 of each cartridge 10 may be prepared on a peripheral region of an edge where electrode leads 12, 14 of the cell 2 are positioned.

Figure 4:
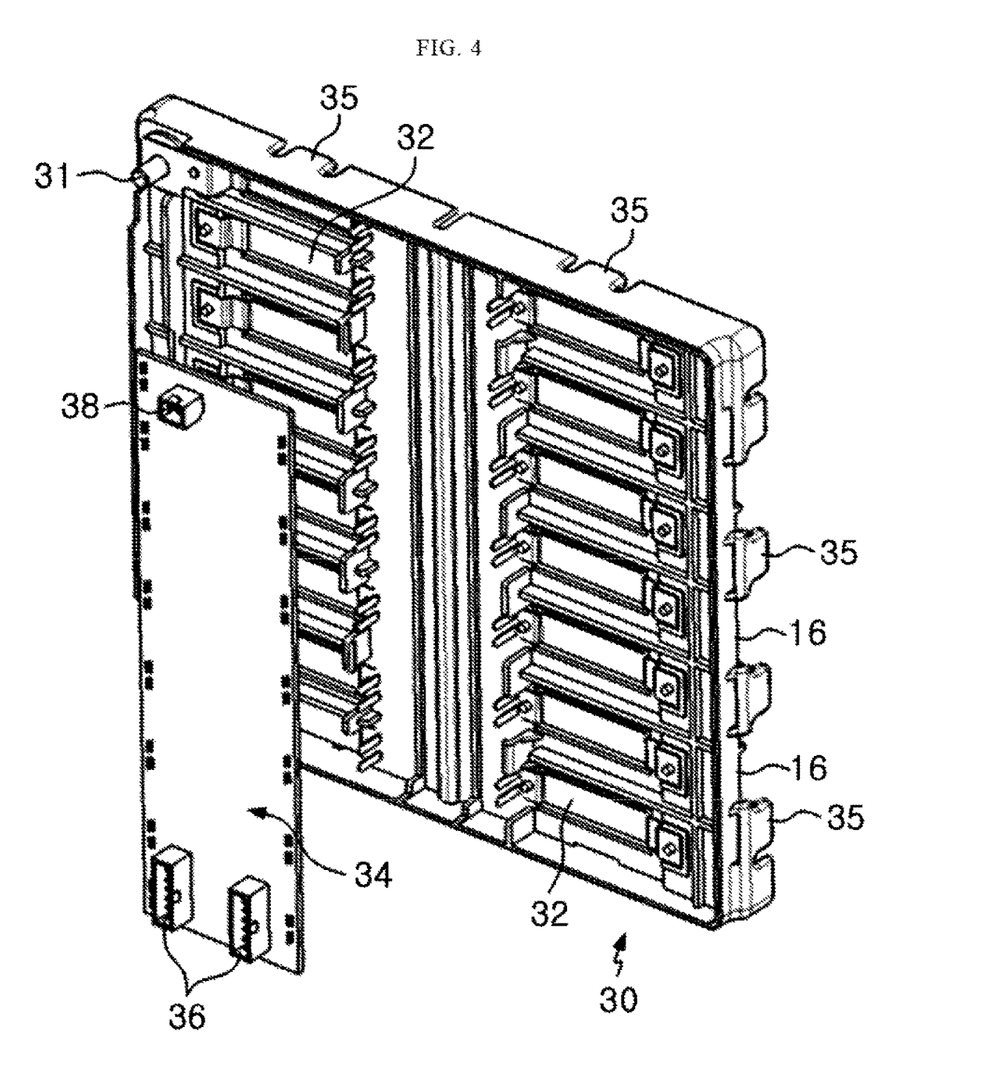
FIG. 4 is an exploded perspective view of the sensing housing of FIG. 2.
Figure 5:
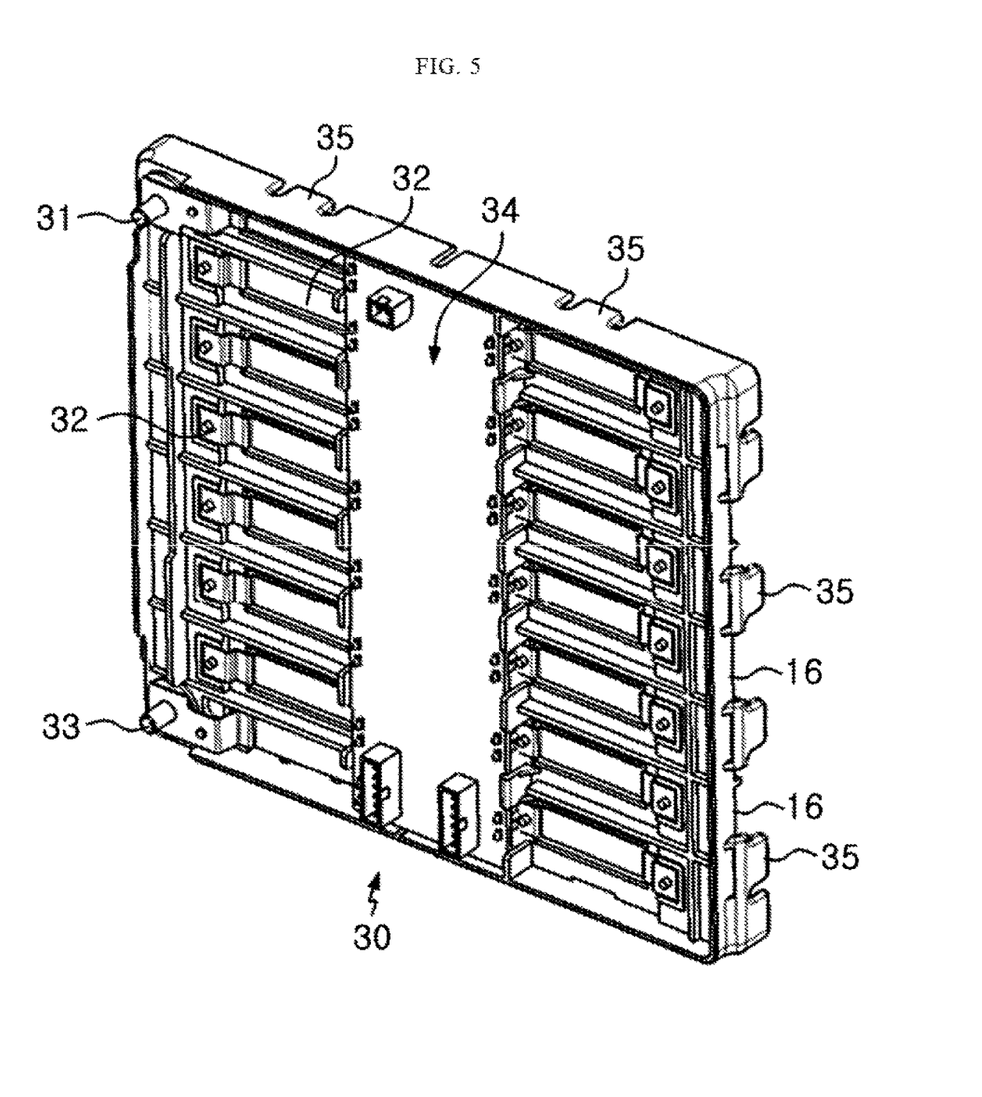
FIG. 5 is a perspective view of FIG. 4 in an assembled state.

FIG. 4 is an exploded perspective view of the sensing housing illustrated in FIG. 2, and FIG. 5 is a perspective view of FIG. 4 in an assembled state.

Referring to FIGS. 2 to 5, the sensing housing 30 may be injection-molded in a roughly rectangular shape with insulating plastics for example, and selectively coupled with or separated from the cartridge assembly 20. For the above, on an edge of the sensing housing 30, a plurality of housing hooks 35 may be integrally prepared with a housing body. As described above, each housing hook 35 may be snap-coupled with the corresponding fastening groove 19 of the cartridge assembly 20. Further, the sensing housing 30 may be installed with a plurality of bus bars 32 disposed correspondingly to the positions of the leads 12, 14 of each cell. Each bus bar 32 may be preferably manufactured with copper, for example. Approximately on a center portion of the sensing housing 30, there may be installed a master form of the BMS circuit board 34 having functions of collecting voltage and/or temperature data of each cell 2 sensed by the corresponding bus bar 32, balancing the corresponding cell 2 through the collected data, and delivering the data to another controller (not illustrated) of the module. The BMS circuit board 34 may be electrically connected with one end of each bus bar 32. Further, when coupled with a plurality of modules 100, the BMS circuit board 34 may be installed with a pair of data communication ports 36 to trans-receive data between respective BMS circuit boards 34, a temperature data port 28 to receive a signal of a temperature sensor (not illustrated) to measure internal temperature of the secondary battery module 100, and a positive electrode terminal 31 and a negative electrode terminal 33 of the completed secondary battery module 100.

The first lead 12 and the second lead 14 of each of the adjacent cells 2 may respectively have a certain width which is extended and curved by a certain distance from a side of each cell 2. The first lead 12 of each cell 2 may be curved by 90 degrees in a downward direction of the drawing, and the second lead 14 may be curved by 90 degrees in an upward direction of the drawing. Further, the first lead 12 and the second lead 14 having opposite polarities to the adjacent cells 2 may form a certain pattern of a lead welding portion. For example, the first lead 12 of one cell 2 among the adjacent cells may be extended from the curved portion by about a half length of a thickness of the cartridge 10, and the second lead 14 of another cell 2 may be extended by about another half length of the thickness of the cartridge 10. Therefore, the first lead 12 and the second lead 14 may be positioned on a same plane in the lead welding portion, with the ends thereof being substantially contacted with or spaced apart from each other by a certain gap, while being faced each other. According to an alternative embodiment, the first lead 12 and the second lead 14 may be disposed to overlap each other. As described above, when the sensing housing 30 is coupled with the cartridge assembly 20 in a state that the first lead 12 and the second lead 14 are forming a certain pattern of the lead welding portion, each of the corresponding bus bars 32 may be faced with the lead welding portion, and the first lead 12 and the second lead 14 of the lead welding portion may be welded to the corresponding bus bars 32 by using a laser welding device, for example.

Figure 6:
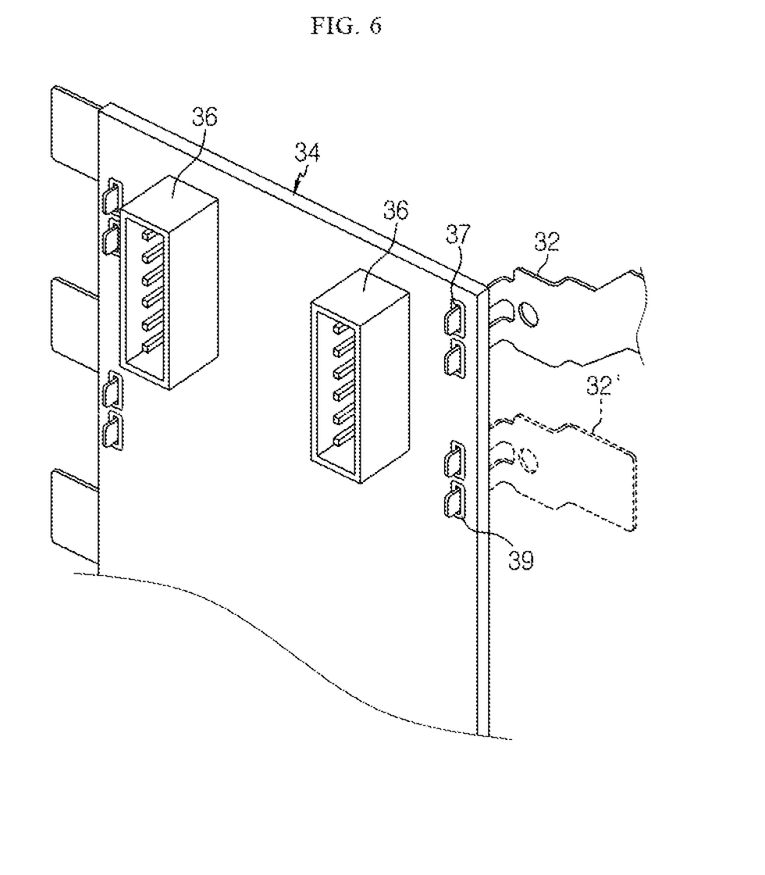
FIG. 6 is an exploded perspective view of the BMS circuit board and the bus bar in FIGS. 4 and 5.

Referring to FIG. 6, an exploded perspective view of the BMS circuit board and the bus bar in FIGS. 4 and 5, while the bus bar 32 and the BMS circuit board 34 are positioned on the sensing housing 30, the bus bar 32 may be electrically connected with the BMS board 34 by soldering, for example. In this case, two positions for the soldering work may be applied per cell 2. That is, in an initial assembling process, a connection terminal at an end of the bus bar 32 may be inserted into a coupling portion 37 formed on the BMS circuit board 34 and soldering may be performed. When rework is needed, a portion previously soldered may be cut for example, the bus bar 32' may be inserted into a remaining spare hole 39 and soldering may be performed again. According to an alternative embodiment, the BMS circuit board 34 may be assembled to the bus bar 32 with, for example, an adhesive tape, a receptacle, and so on, in addition to the soldering described above, which can be easily understood by a person skilled in the art.

Referring to FIGS. 1 to 3 again, the sensing cover 40 may be prepared to protect the BMS circuit board 34 and the bus bar 32 while the sensing housing 30 is coupled with the cartridge assembly 20. The sensing cover 40 may be preferably injection-molded with an insulating plastic material. Further, the sensing cover 40 may include a plurality of cover hooks 42 prepared on an edge thereof. Each of the cover hooks 42 may be selectively inserted into housing slots 16 respectively prepared on corresponding positions of the sensing housing 30.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description. Accordingly, the embodiments disclosed in the present disclosure are provided to explain, not to limit a technical art of the present disclosure, and thus, the scope of the present disclosure is not limited. The scope of the present disclosure should be construed by following claims, and every technical art within a same scope of the following claims should be construed to be included in a scope of a right of the present disclosure.

The present disclosure relates to a compact secondary battery module integrated with BMS, which may be specifically applied in the secondary battery module related industry.

What is claimed is:

1. A compact secondary battery module integrated with BMS, comprising:
    a cartridge assembly in which at least two or more cartridges receiving a secondary battery cell are stacked and coupled, the cartridge assembly having a top surface, a bottom surface, a front wall and a back wall;
    electrodes of the secondary battery cells extending from the front wall of the cartridge assembly; and
    a sensing housing disposed on the front surface of the cartridge assembly, the sensing housing having at least two bus bars electrically connected with the electrodes of the secondary battery cells and a BMS circuit board between the at least two bus bars, the at least two bus bars connected to the BMS circuit board.

2. The compact secondary battery module of claim 1, wherein the sensing housing is selectively coupled with or separated from the cartridge assembly.

3. The compact secondary battery module of claim 2, comprising a plurality of housing hooks prepared on an edge of the sensing housing; and
    a plurality of assembly fastening grooves prepared on a side surface of the cartridge assembly such that each of the housing hooks is coupled.

4. The compact secondary battery module of claim 1, comprising spare holes prepared on the BMS circuit board to be connected with each bus bar to enable rework of the BMS circuit board.

5. The compact secondary battery module of claim 1, wherein the BMS circuit board is a master BMS circuit board to manage voltage and/or temperature data of each cell sensed by each bus bar.

6. The compact secondary battery module of claim 1, further comprising a sensing cover selectively coupled with or separated from the sensing housing.

7. The compact secondary battery module of claim 6, comprising a plurality of cover hooks prepared on an edge of the sensing cover; and
a plurality of housing slots prepared on the sensing housing such that each of the cover hooks is coupled.

8. The compact secondary battery module of claim 1, wherein two adjacent cartridges of the cartridge assembly are hook-coupled with each other.

9. The compact secondary battery module of claim 1, wherein the cartridge assembly further comprises an upper cover and a lower cover which are respectively hook-coupled with the cartridges on both ends.

10. A secondary battery pack comprising the compact secondary battery module according to claim 1.

11. The secondary battery pack of claim 10, wherein the secondary battery pack comprises a home photovoltaic solar panel energy storage system.

12. The compact secondary battery module of claim 1, further comprising mating connectors on side edges of the front wall of the cartridge assembly and side edges of the sensing housing for removable attaching the sensing housing to the cartridge assembly.

13. The compact secondary battery module of claim 12, wherein the mating connectors are hooks and slots.

14. The compact secondary battery module of claim 12, wherein the cartridges are vertically stacked.

15. The compact secondary battery module of claim 12, wherein the cartridges are removable connected to adjacent cartridges.

16. The compact secondary battery module of claim 1, wherein the at least two bus bars connect to opposite sides of the BMS circuit board, and
wherein the at least two bus bars extend outwardly in opposite directions from the BMS circuit board.

17. The compact secondary battery module of claim 1, wherein the bus bars have coupling portions,
wherein the BMS circuit board has openings, and
wherein the bus bars are coupled to the BMS circuit board by the coupling portions of the bus bars extending into the openings.

* * * * *